Patented Dec. 28, 1926.

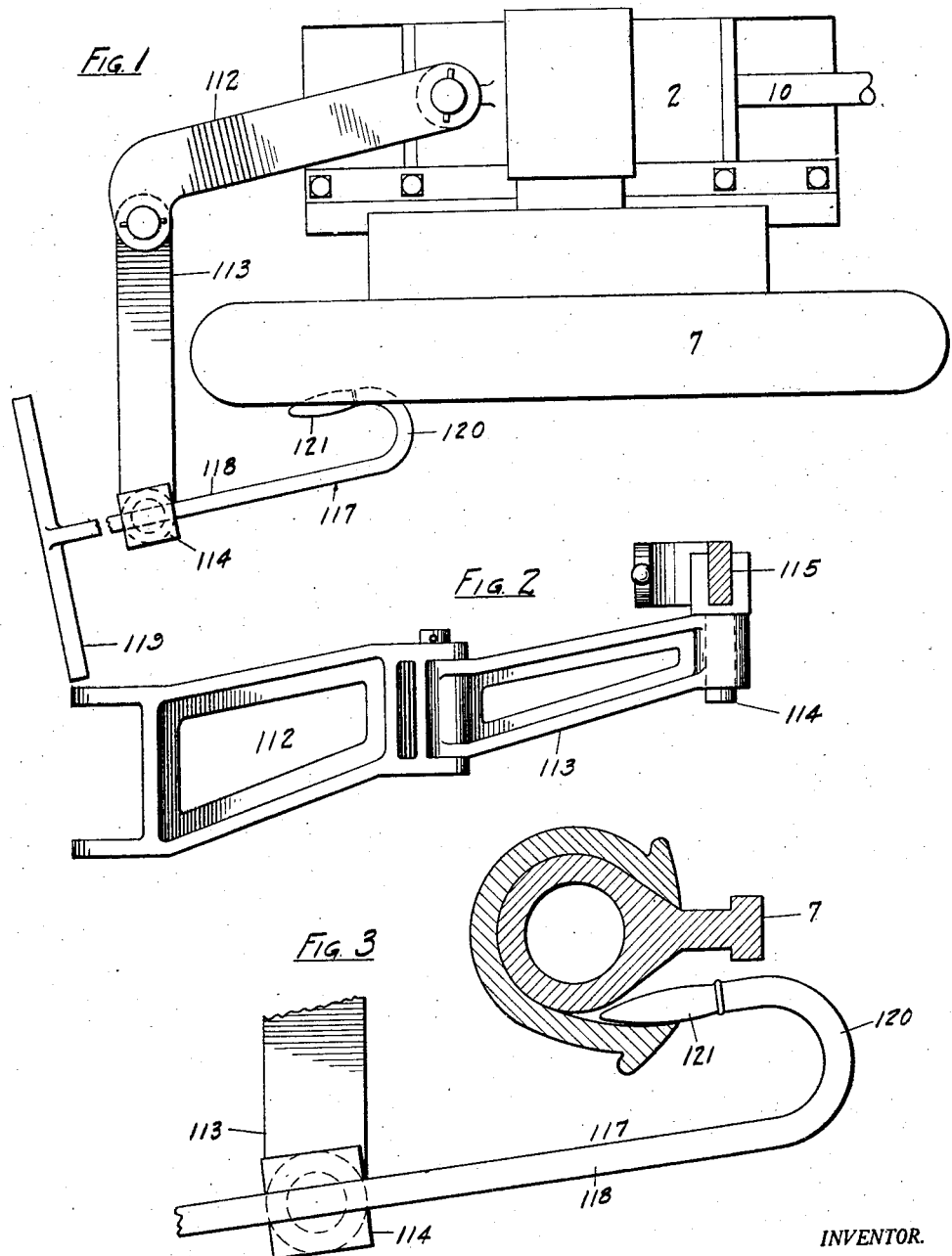

1,612,546

UNITED STATES PATENT OFFICE.

WILLIAM C. STEVENS, OF AKRON, OHIO, ASSIGNOR TO THE FIRESTONE TIRE AND RUBBER COMPANY, OF AKRON, OHIO, A CORPORATION OF OHIO.

TIRE-STRIPPING DEVICE.

Original application filed January 4, 1923, Serial No. 610,577. Divided and this application filed April 3, 1926. Serial No. 99,584.

This invention relates to tire stripping devices for tire building machines and is a division of application Serial No. 610,577, filed January 4, 1923.

The object of the invention is to provide an improved stripping device for facilitating the removal of the tires from the cores.

Of the accompanying drawings:

Figure 1 is a plan view illustrating the tire stripping device of the invention;

Figure 2 is an elevational view of an adjustable support forming a part of the tire stripping device; and Figure 3 is a plan view, partly in section, illustrating the operation of the stripping device.

Referring to the drawings, 2 represents the core stand and 7 the tire building core of a tire building machine, the core being driven by a drive shaft 10.

Upon the core stand 2, an arm 112 is pivoted to swing about a vertical axis and to project toward the front of the core. Each arm 112 carries an extension 113 that is pivoted at one of its ends to swing about a vertical axis and across the front of the core. The other end of the extension 113 carries a vertically disposed rotatable stud 114 having a bifurcated upper end 115. The stud 114 is designed to receive a stripping tool 117 which comprises a straight shank portion 118 adapted to seat and slide in the bifurcated end 115 of the extension 113. One end of the tool is provided with a handle 119 so that the stud may be rotated to position the shank portion 118 of the tool relative to the core. The other end of the shank 118 is bent to form a hook 120 projecting toward the core when the tool is in position and terminating in a pointed conical portion 121 that extends parallel with the shank 118. The portion 121 is designed to be inserted between the core and the carcass, and the core rotated to break the adhesion between the core and carcass and facilitate in removing the latter.

It is believed that the operation and advantages of my invention will be apparent from the foregoing description.

Although the description is somewhat detailed and certain specific terms and language have been used therein, it is to be understood that various changes and modifications are within the spirit of my invention and are intended to be comprehended by the present disclosure.

What is claimed is:

1. In mechanism of the class described, in combination, a tire building machine including a rotatable core, a pivoted mounting constructed and arranged to swing across the periphery of the core, and an element adapted to swing upon the mounting and to be inserted between the carcass and the core to break the adhesion therebetween.

2. In mechanism of the class described, in combination, a tire building machine including a rotatable core, a pivoted mounting constructed to swing across the periphery of the core, and a sliding element adapted to swing upon the mounting and to be inserted between the carcass and the core to break the adhesion therebetween.

WILLIAM C. STEVENS.